United States Patent
Leishman et al.

(10) Patent No.: US 8,568,198 B2
(45) Date of Patent: Oct. 29, 2013

(54) ACTIVE COOLANT FLOW CONTROL FOR MACHINING PROCESSES

(75) Inventors: James Leishman, Candiac (CA); Amr Elfizy, Longueuil (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 584 days.

(21) Appl. No.: 12/837,599

(22) Filed: Jul. 16, 2010

(65) Prior Publication Data

US 2012/0015587 A1   Jan. 19, 2012

(51) Int. Cl.
*B24B 49/00* (2012.01)
*B24B 51/00* (2006.01)

(52) U.S. Cl.
USPC .................. 451/5; 340/680; 451/7; 451/8

(58) Field of Classification Search
USPC ................... 340/680; 451/5, 7, 8, 53
See application file for complete search history.

(56) References Cited

U.S. PATENT DOCUMENTS

| | | | |
|---|---|---|---|
| 3,594,953 A | 7/1971 | Stade | |
| 4,076,442 A | 2/1978 | Cox, Jr. et al. | |
| 4,450,652 A | 5/1984 | Walsh | |
| 5,028,176 A | 7/1991 | Delventhal et al. | |
| 5,445,553 A | 8/1995 | Cryer et al. | |
| 5,595,462 A | 1/1997 | Hensley | |
| 5,951,216 A | 9/1999 | Antoun | |
| 5,993,297 A | 11/1999 | Hyatt et al. | |
| 6,174,224 B1 | 1/2001 | Iachine et al. | |
| 6,305,183 B1 | 10/2001 | Mukai et al. | |
| 6,641,459 B2 | 11/2003 | Ball | |
| 6,669,118 B2 | 12/2003 | Webster | |
| 6,767,273 B1 | 7/2004 | Coverdale et al. | |
| 6,783,309 B2 | 8/2004 | Makiyama | |
| 6,874,977 B2 | 4/2005 | Cook et al. | |
| 7,000,734 B2 | 2/2006 | Nawamoto et al. | |
| 7,086,930 B2 | 8/2006 | Webster | |
| 7,452,261 B2 | 11/2008 | Gretler et al. | |
| 7,473,160 B1 * | 1/2009 | Gerstner | 451/7 |
| 7,481,696 B2 | 1/2009 | Mukai et al. | |
| 7,699,685 B1 * | 4/2010 | Gerstner | 451/7 |
| 2006/0068683 A1 * | 3/2006 | Sudo | 451/5 |

* cited by examiner

*Primary Examiner* — Timothy V Eley
(74) *Attorney, Agent, or Firm* — Norton Rose Fulbright Canada LLP

(57) ABSTRACT

A system for machining a work-piece is described which includes a machine tool and coolant delivery unit, pressure and flow rate sensors, and a control unit. The control unit controls coolant delivery and is adapted to detect a first anomaly when either a measured flow rate or pressure deviates from target flow rates and pressures by a first predetermined amount, and to detect a second anomaly when the measured flow rate or pressure deviates from the target flow rates and pressures by a second predetermined amount greater than the first. An alarm signal is outputted when the first anomaly is detected, and the machine tool is stopped when the second anomaly is detected.

12 Claims, 4 Drawing Sheets

ACTIVE COOLANT FLOW CONTROL FOR MACHINING PROCESSES

TECHNICAL FIELD

The application relates generally to methods and systems for controlling active coolant flow in machining processes, more particularly in superabrasive machining processes for gas turbine engines.

BACKGROUND

Superabrasive machining is an enabling process for machining nickel-based alloys for gas turbine engine applications, for example. Similarly, end-milling, point-milling, and flank-milling are enabling processes for machining titanium and magnesium alloys. These machining processes usually require cooling of the work-piece being machined. However, these machining processes are sensitive to the efficiency of the coolant delivery system since any deficiencies in the coolant reaching a work-piece being machined may result in damage or destruction of the work-piece. In addition, some of these processes require the use of inflammable coolants and/or are used to machine work-pieces made from inflammable material.

Accordingly, there is a need for controlling coolant flow provided to a machining tool during a machining process.

SUMMARY

There is provided a method for operating a machining tool, the method comprising: setting a flow rate and a pressure of a flow of coolant to a flow rate target and a pressure target, respectively, the coolant flow being provided to the machining tool; machining a work-piece using the machining tool; measuring the flow rate and the pressure of the flow of coolant; and detecting a first anomaly when at least one of the measured flow rate and the measured pressure deviates from the flow rate target and from the pressure target, respectively, by a first predetermined amount, and taking a first corrective action comprising triggering an alarm while allowing the machining of the work-piece to continue; and detecting a second anomaly when at least one of the measured flow rate and the measured pressure deviates from the flow rate target and the pressure target, respectively, by a second predetermined amount greater than the first predetermined pressure amount, respectively, and taking a second corrective action comprising stopping the machining of the work-piece.

There is also provided a system for machining a work-piece, comprising: a machine tool for machining a work-piece; a coolant delivery unit for delivering a coolant flow having a flow rate and a pressure to the machine tool; a pressure sensor for measuring the pressure of the coolant flow; a flow rate sensor for measuring the flow rate of the coolant flow; and a control unit in communication with the coolant delivery unit, the machine tool, the pressure sensor, and the flow rate sensor, and adapted to: control the coolant delivery unit for setting the flow rate and the pressure to a target flow rate and a target pressure, respectively, using the measured flow rate and the measured pressure; detect a first anomaly when at least one of the measured flow rate and the measured pressure deviates from the flow rate target and from the pressure target, respectively, by a first predetermined amount, and output an alarm signal while allowing a machining of the work-piece to continue; and detect a second anomaly when at least one of the measured flow rate and the measured pressure deviates from the flow rate target and the pressure target, respectively, by a second predetermined amount greater than the first predetermined pressure amount, respectively, and send a stop signal to the machining tool for stopping the machining of the work-piece.

In a further aspect, there is provided a control unit for monitoring a coolant flow delivered to a machining tool for machining a work-piece, the control unit comprising: a pressure controller for setting a pressure of the coolant flow to a target pressure; a flow rate controller for setting a flow rate of the coolant flow to a target flow rate; and an anomaly detector adapted to: receive a measured flow rate and a measured pressure for the coolant flow from a flow rate sensor and a pressure sensor, respectively; detect a first anomaly when at least one of a measured flow rate and a measured pressure deviates from the flow rate target and from the pressure target, respectively, by a first predetermined amount, and output an alarm signal while allowing the machining of the work-piece to continue; and detect a second anomaly when at least one of the measured flow rate and the measured pressure deviates from the flow rate target and the pressure target, respectively, by a second predetermined amount greater than the first predetermined pressure amount, respectively, and send a stop signal to the machining tool for stopping the machining of the work-piece.

DESCRIPTION OF THE DRAWINGS

Reference is now made to the accompanying figures, in which.

DETAILED DESCRIPTION

Figure 1:
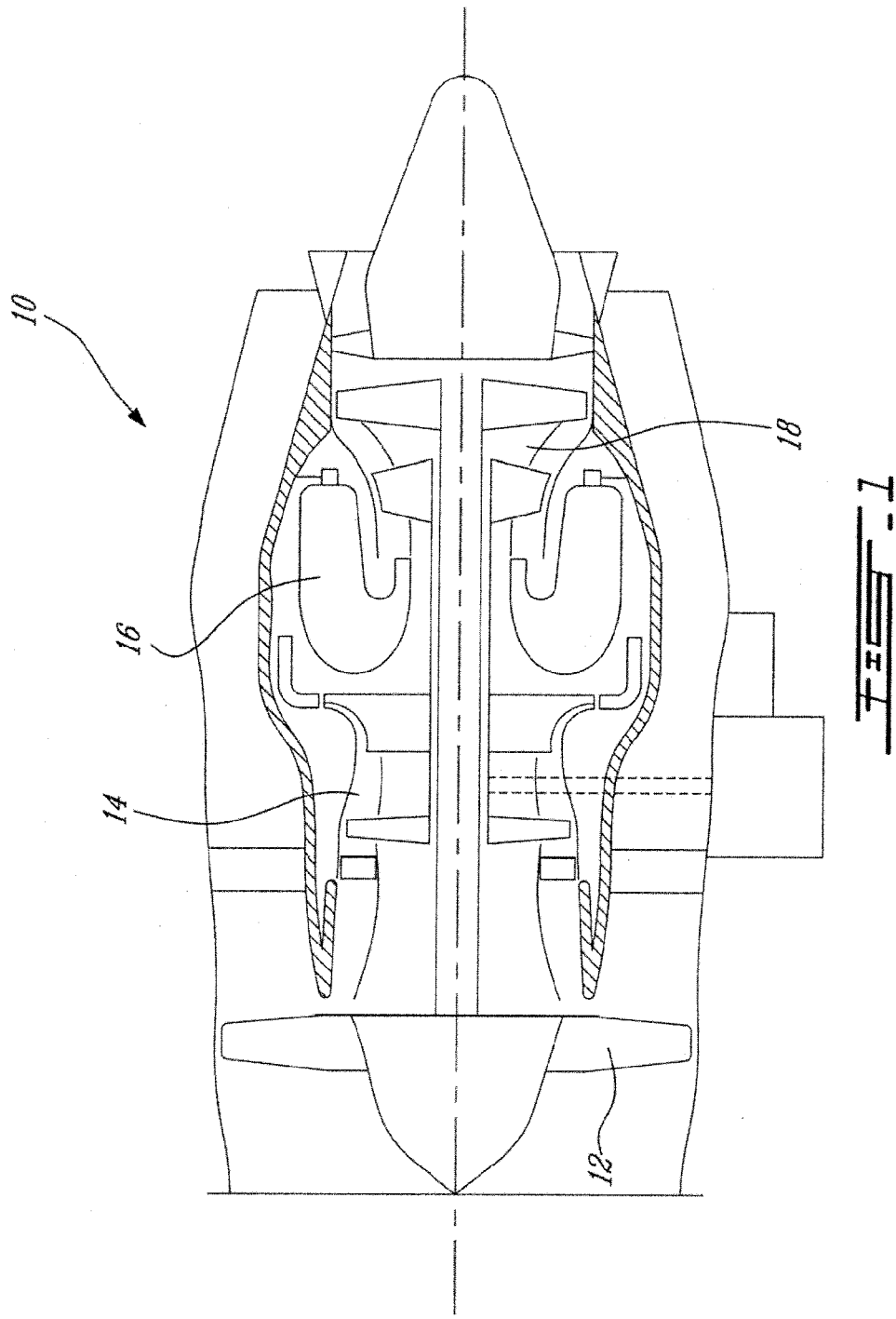
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
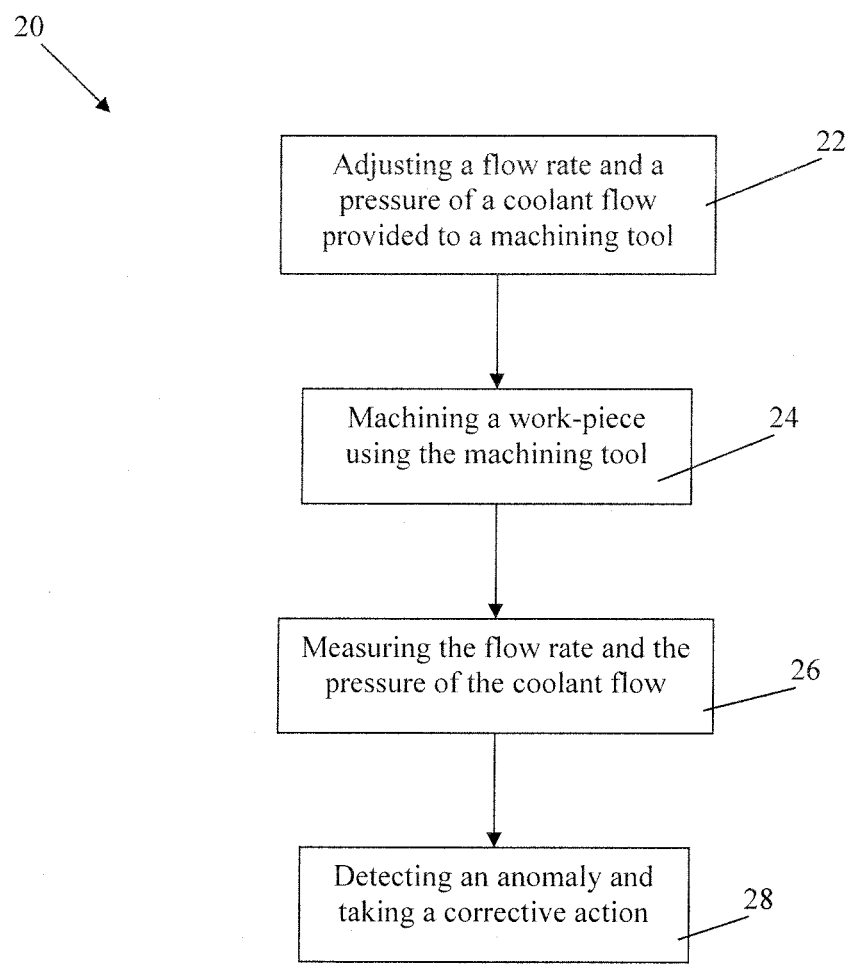
FIG. 2 is a flow chart of a method for operating a machining tool, in accordance with an embodiment.

FIG. 2 illustrates one embodiment of a method 10 for operating a machining tool in a process of machining a work-piece, such as a part of the gas turbine engine 10. The machining process comprises the use of a coolant introduced to the machining area in order to remove energy generated in machine tool operations.

The term "machining" is used generally herein to describe any of the variety of processes for shaping and/or finishing a work-piece. Examples of machining processes comprise abrasive machining, superabrasive machining, milling, honing, polishing, working, lapping, grinding, contouring, and the like. It should be understood that the machining tool can be any adequate tool adapted to apply the machining process.

For example, the machining process can be an end-milling process, a point-milling process, a face-milling process, or a flank-milling process. In another example, the machining process is a superabrasive machining process. Superabrasive machining is a machining process where material is removed from a work-piece using superabrasive material particles. A superabrasive material is a material having characteristically long life and high grinding productivity. Examples of superabrasive material comprise cubic boron nitride, polycrystalline diamond, and the like.

In one embodiment, the superabrasive machining process is a bonded superabrasive process in which the superabrasive particles are held together within a matrix, and their combined shape determines the geometry of the finished work-piece. For example, the superabrasive particles can be bonded together in a wheel. As the grinding wheel is fed into the work-piece, its shape is transferred onto the work-piece.

Referring back to FIG. 2, the first step 22 of the method 20 comprises adjusting the flow rate and the pressure of the flow of coolant provided to the machining tool to predetermined or target values. The target values for the flow rate and the pressure are adapted to efficiently remove heat from the work-piece and/or the machining tool while machining the work-piece.

It should be understood that the coolant may be any adequate coolant adapted to the machining process, such as inflammable (i.e. non-flammable) mineral oil-based coolants for example. Alternately, however, a non-inflammable coolant can be used, whereby the coolant flow rate and/or pressure are monitored such as to protect against work-piece damage which might result due to insufficient coolant flow or pressure when using such a non-inflammable water-soluble cutting coolant.

At step 24, the machining of the work-piece starts using the machining tool. The flow of coolant is continuously provided to the machining tool during the machining step, and the flow rate and pressure of the coolant flow are measured (step 26). The measured flow rate and pressure of the coolant flow are used to determine anomalies. At step 28, if an anomaly is detected, a corrective action is taken.

In one embodiment, a first-type anomaly is diagnosed when the measured flow rate and/or the measured pressure deviates from their respective target value by a first predetermined amount. For example, such a first-type anomaly can be considered to be an anomaly which does not threaten the machining process and is not going to cause a fire within the machine tool. In this case, the corrective action consists in triggering an alarm while allowing the machining of the work-piece to continue.

In one embodiment, the machining of the work-piece is permitted to continue until the machining tool has cleared the work-piece, whereupon the machining tool and the flow of coolant are stopped and the alarm is triggered. The machining process may be prevented from restarting until the fault has been cleared.

In another embodiment, a second-type anomaly is diagnosed when the measured flow rate and/or the measured pressure deviate from their respective target value by a second predetermined amount superior to the first predetermined amount. For example, such a second-type anomaly can be considered to be an anomaly which does not threaten the machining process, but may ignite a fire in the machining tool. In this case, the corrective action consists in stopping the machining process. The machining process may be stopped by stopping the machining tool and/or withdrawing the work-piece from the machining tool, for example. The corrective action may also comprise stopping the flow of coolant provided to the machining tool and/or triggering an emergency alert once the machine spindle has been stopped.

In one embodiment, when the measured flow rate decreases from its target value by the first or second predetermined amount and/or the measured pressure increases from its target value by the first or second predetermined amount, the anomaly is identified as being a blockage of the coolant delivery system.

In another embodiment, when the measured flow rate increases from its target value by the first or second predetermined amount and/or the measured pressure decreases from its target value by the first or second predetermined amount, the anomaly is identified as being a damage to the coolant delivery system or a leakage in the coolant delivery system.

In one embodiment, the flow rate and/or the pressure is substantially continuously adjusted during the machining step 24. After being adjusted to their respective target value at the beginning of the method 20, the flow rate and/or the pressure of the coolant flow are controlled during the machining of the work-piece in order to be maintained substantially constant.

It should be understood that any adequate method for maintaining the pressure and/or flow rate of the coolant flow substantially constant and equal to their respective target value may be used. For example, a feedback-loop control method, such as a proportional-derivative-integral (PID) method or a proportional-integral (PI) method, can be used. In this case, the measured flow rate and/or pressure are used for determining the adjustment of the flow rate and pressure, respectively, required for obtaining the target values. For example, a feedback-loop control may be used in case of a reduced flow situation due to deteriorations or restrictions within the coolant supply line to the machining area in order to allow the flow rate to reach its target value faster.

Figure 3:
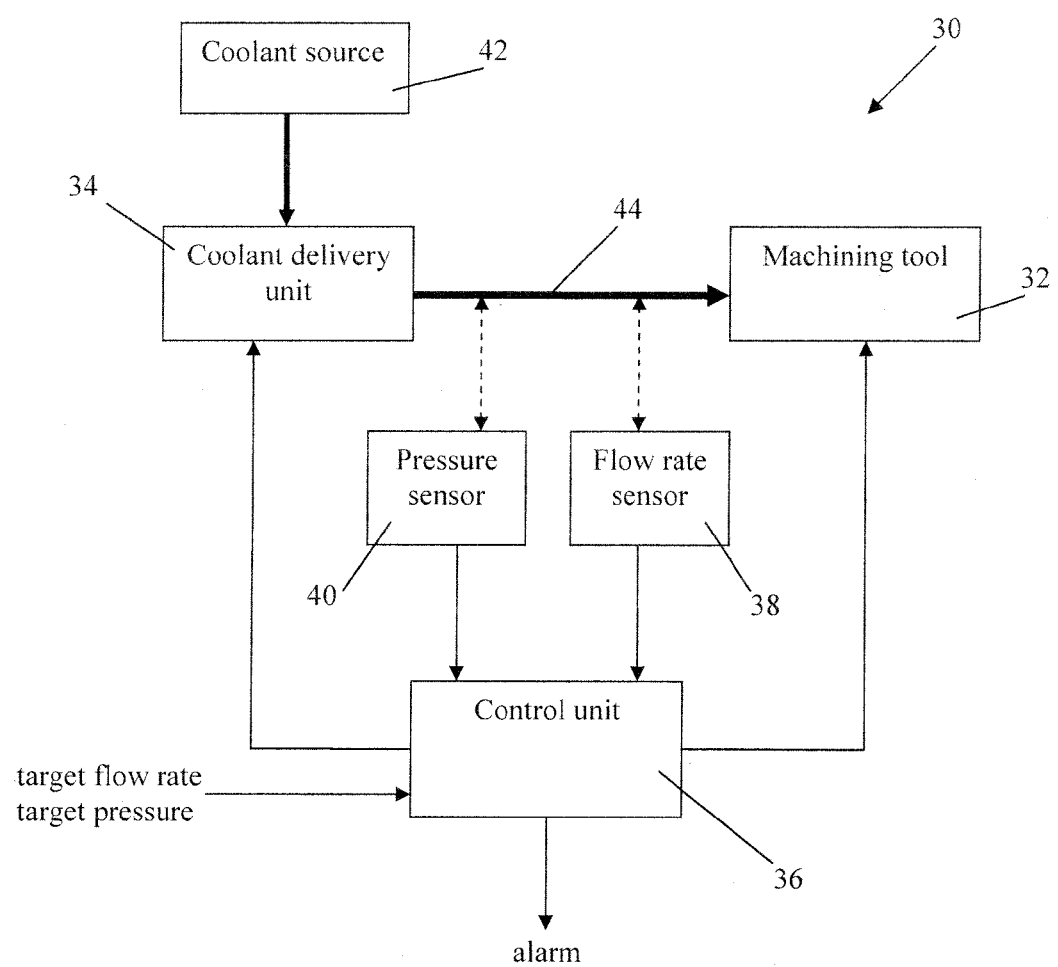
FIG. 3 is a block diagram illustrating a machining system comprising a machining tool, a control unit and a coolant delivery unit, in accordance with an embodiment.

FIG. 3 illustrates one embodiment of a system 30 for machining a work-piece. The system comprises a machining tool 32, a coolant delivery unit 34, a control unit 36, a flow rate sensor 38, and a pressure sensor 40. The machining tool 32 is adapted to receive a work-piece to be machined in a machining area and to machine the work-piece. The coolant delivery unit 34 is connected to a source of coolant 42 and adapted to deliver a flow of coolant 44 having a flow rate and a pressure to the machining tool 32, and vary the flow rate and the pressure independently from one another. The control unit 36 is connected to the coolant delivery unit 34 and the flow rate and pressure sensors 38 and 40. The control unit 36 is adapted to adjust the flow rate and pressure of the coolant flow 44 to target values by controlling the coolant delivery unit 34. The flow rate sensor 38 and the pressure sensor 40 are adapted to respectively measure the flow rate and the pressure of the flow of coolant provided by the coolant delivery unit 34 to the machining tool 32, and to transmit the measured values to the control unit 36.

The control unit 36 receives the target flow rate and pressure for the coolant flow 44 as input, and the measured flow rate and pressure from the flow rate sensor 38 and the pressure sensor 40, respectively. The control unit 36 is adapted to determine coolant delivery unit operation parameters adapted to provide the target flow rate and pressure for the coolant flow 44, and communicate the operation parameters to the coolant delivery unit 34. Upon reception of the operation parameters, the coolant delivery unit 34 outputs a flow of coolant 44 having the target flow rate and pressure by adjusting its operation parameters to the operation parameters values received from the coolant control unit 36.

The control unit 36 is also adapted to determine anomalies with respect to the coolant flow 44 by comparing the measured flow rate and pressure to the target flow rate and pressure, respectively, and take corrective actions. In one embodiment, the control unit 36 diagnoses a first-type anomaly when the measured flow rate and/or the measured pressure deviate from their respective target value by a first predetermined amount. For example, such a first type anomaly can be considered to be an anomaly which does not threaten the machining process and is not going to cause a fire within the machine tool. After determining a first-type anomaly, the control unit 36 outputs an alarm signal, as corrective action, in order to inform a user of the machining tool 32 of the anomaly, while allowing the machining of the work-piece to continue.

In one embodiment, the control unit 36 is in bidirectional communication with the machining tool. When the control unit 36 determines that the measured flow rate and/or the measured pressure deviate from their respective target value by a first predetermined amount, the control unit 36 allows for the machining tool 32 to continue machining the work-piece until the machining tool 32 has cleared the work-piece, whereupon the control unit 36 stops the machining tool 32 and the flow of coolant 44 and triggers the alarm. The control unit 36 may further be adapted to prevent the machining tool 32 from restarting until the fault has been cleared.

The control unit 36 is also adapted to diagnose a second-type anomaly when the measured flow rate and/or the measured pressure deviate from their respective target value by a second predetermined amount superior to the first predetermined amount. For example, such a second-type anomaly can be considered to be an anomaly which does not threaten the machining process, but may potentially ignite a fire in the machining tool 32. Upon detection of a second-type anomaly, the control unit 36 stops the machining process, as corrective action, by sending a stop signal to the machining tool 32. Upon reception of the stop signal, the machining tool 32 may stop the machining of the work-piece and/or withdraw the workpiece from the machining tool, for example. In one embodiment, the control unit 36 is also adapted to send a coolant stop signal to the coolant delivery unit 34 in order to stop the flow of coolant 44 provided to the machining tool 32. In the same or an alternate embodiment, the control unit 36 is adapted to output an emergency alarm signal upon detection of a second-type anomaly in order to inform the user of the detected anomaly.

It should be understood that the alarm signal and emergency alarm signal output by the control unit 36 trigger any adequate type of alarm allowing the user to be informed of the detected anomaly. The alarm may be a visual alarm, a sound alarm, etc. For example, upon detection of a first-type anomaly, the control unit 36 may send the alarm signal to the user interface of the machining tool 32 which display a visual alarm on the display of the user interface.

In one embodiment, the coolant delivery unit 34 comprises a flow rate adjustment device adapted to vary the flow rate of the coolant flow and a pressure adjustment device adapted to vary the pressure of the coolant flow. Any adequate flow rate adjusting device and pressure adjusting device may be used. Examples flow rate adjusting devices and pressure adjusting devices comprise adjustable valves, adjustable nozzles, and the like. In this case, the coolant control unit 36 is adapted to determine the control parameter of the flow rate adjusting device from the measured flow rate and the desired flow rate for the coolant flow 44. For example, if the pressure adjusting device is a flow rate valve, the control unit 36 determines the flow rate valve position adequate for providing the desired flow rate using the difference between the measured flow rate and the desired flow rate. The coolant control unit 36 is also adapted to determine the control parameter of the pressure adjusting device from the measured pressure and the desired pressure for the coolant flow 44. For example, if the pressure adjusting device is an adjustable nozzle, the control unit 36 determines the nozzle position adequate for providing the desired pressure using the difference between the measured and desired pressures.

In one embodiment, the control unit 36 sets the control parameters for the flow rate adjusting device and the pressure adjusting device in accordance with the target flow rate and pressure, respectively, before or at the beginning of the machining of the work-piece, and the settings of the control parameters are not changed during the machining process.

In another embodiment, the control unit 36 is adapted to substantially continuously adjust the flow rate and/or pressure during the machining process. For example, the target flow rate and/or pressure may vary during the machining process and the control unit 36 substantially continuously determines the corresponding control parameter of the flow rate adjusting device and/or the pressure adjusting device to maintain the flow rate and/or the pressure of the coolant flow substantially equal to their respective target value.

In one embodiment, the control unit comprises a database stored in a memory. The database comprises control parameter values for the flow rate adjusting device and the pressure adjusting device for different values of measured and target flow rates and different values of measured and target pressures, or different values for differences between measured and target flow rates and different values for differences between measured and target pressures.

In another embodiment, the control unit comprises a memory and a processor configured for applying a feedback-loop control method, such as a PID or a PI method, as described above, in order to determine the control parameter for the flow rate adjusting device and/or the pressure adjusting device to maintain the flow rate and/or pressure of the coolant flow 44 substantially equal to the target flow rate and/or pressure.

The flow rate sensor 38 and the pressure sensor 40 may be positioned at any adequate location along the flow of coolant. In one embodiment, the flow rate sensor 38 and the pressure sensor 40 are located between the coolant delivery unit 34 and the machining tool 32. In another embodiment, the flow rate sensor 38 and the pressure sensor 40 are located as close as possible to the point of operation, i.e. just prior to the coolant discharge nozzle(s).

Examples of adequate coolant flow rate sensors comprise Venturi valves, calibrated pressure-differential Venturi flow meters, transit-time flow sensors, Pitot tube sensors, flow transducers, and the like. Examples of adequate pressure sensors comprise pressure-differential calibrated flow measuring devices, pressure transducers, piezometers, manometers, and the like.

In one embodiment, the coolant flow 44 is delivered to the machining tool 32 via a fluidic connection such a pipe for example. The output of the fluidic connection is positioned at an adequate location with respect to the work-piece to be machined so that the delivered coolant flow 44 adequately removes heat generated during the machining process. For example, the fluidic connection output may be secured to the machining tool 32 in the machining area where the work-piece is to be machined.

While the present description refers to a single coolant flow 44, it should be understood that more than one coolant flows may be provided to the machining tool 32. In this case, each coolant flow is provided with a corresponding flow rate sensor and pressure sensor, and the control unit 36 is adapted to control the flow rate and pressure for the coolant flows and to diagnose anomalies for each one of the coolant flows. When a plurality of coolant flows are provided to the machining tool 32, the coolant flow may have different target flow rates and/or pressures. In this case, the control unit 36 is adapted to independently control the flow rate and/or pressure for each one of the coolant flows, and determine anomalies for each one of the coolant flows using their respective measured flow rate and pressure. Alternatively, the coolant flows may have a same target flow rate and/or pressure.

The control unit 36 may be provided with a user interface for inputting the desired flow rate and pressure for the coolant flow 44. The control unit user interface may also be used for displaying alarms to the user. Alternatively, a same user interface may be used for communicating with both the machining tool 32 and the control unit 36.

Figure 4:
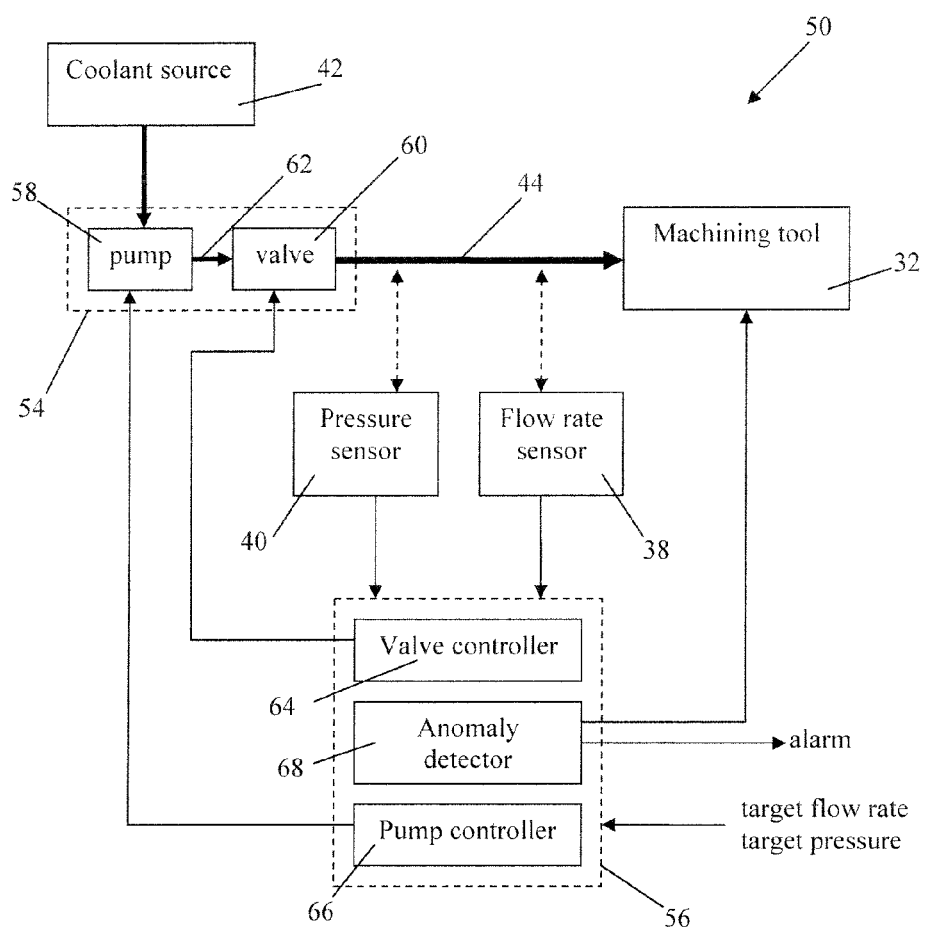
FIG. 4 is a block diagram of the machining system of FIG. 3 in which the control unit comprises a variable frequency drive and a valve controller, and the coolant delivery unit comprises a pump and a pressure valve, in accordance with an embodiment.

FIG. 4 illustrates one embodiment of a system 50 for machining a work-piece. The system 50 comprises a machining tool 32, a coolant delivery unit 54, a control unit 56, a flow rate sensor 38, and a pressure sensor 40. The coolant delivery unit comprises a pump 58 having a pump speed (rpm) as control parameter, and a controllable pressure valve 60 having a pressure valve position as control parameter. The pump 58 receives coolant from a coolant source, such as a coolant reservoir for example, and generates a flow of coolant 62 having a given flow rate. The flow rate of the coolant flow 62 can be adjusted to a desired value by varying the pump control parameter, i.e. the pump speed. The coolant flow 62 is transmitted to the pressure valve 60 which is adapted to adjust the pressure of the coolant flow 62 to a given pressure. The valve 60 then outputs the flow of coolant 44 having the given flow rate and pressure and being delivered to the machining tool 32.

The control unit 56 comprises a valve controller 64, a pump controller 66, and an anomaly detector 68. The control unit 56 receives the measured flow rate and pressure of the coolant flow 44, and the target flow rate and pressure as inputs. The valve controller 64 is adapted to determine the adequate pressure valve position for the pressure valve 60 using the measured pressure and the target pressure and to communicate the determined pressure valve position to the pressure valve 60 which adjusts the pressure of the coolant flow 62 to the target value. The pump controller 66 is adapted to determine the adequate pump speed for the pump 58 using the measured flow rate and the target flow rate, and communicate the determined pump speed to the pump 58 which adjusts its speed to the determined pump speed to delivers a coolant flow 62 having the target flow rate.

In order to determine the adequate pressure valve position and pump speed, the valve controller 64 and pump controller 66 may use any adequate method as described above. For example, the valve controller 64 and the pump controller 66 may use feedback-loop control methods for controlling the pressure valve 60 and the pump 58, respectively.

The anomaly detector 68 is adapted to detect anomalies with respect to the coolant flow 44 and/or output an alarm signal and/or stop the machining process, as described above.

In one embodiment, the pump controller 66 comprises a variable frequency drive (VFD) for controlling the pump speed by controlling the frequency of the electrical current used for powering the pump. In this case, the frequency of the electrical current supplied to the pump is adapted to provide the target flow rate for the coolant flow 44.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A system for machining a work-piece, comprising:
   a machine tool for machining a work-piece;
   a coolant delivery unit for delivering a coolant flow having a flow rate and a pressure to said machine tool;
   a pressure sensor for measuring said pressure of said coolant flow;
   a flow rate sensor for measuring said flow rate of said coolant flow; and
   a control unit in communication with said coolant delivery unit, said machine tool, said pressure sensor, and said flow rate sensor, and adapted to:
      control said coolant delivery unit for setting said flow rate and said pressure to a target flow rate and a target pressure, respectively, using said measured flow rate and said measured pressure;
      detect a first anomaly when at least one of said measured flow rate and said measured pressure deviates from said target flow rate and from said target pressure, respectively, by a first predetermined amount, and output an alarm signal while allowing a machining of said work-piece to continue; and
      detect a second anomaly when at least one of said measured flow rate and said measured pressure deviates from said target flow rate and said target pressure, respectively, by a second predetermined amount greater than said first predetermined pressure amount, respectively, and send a stop signal to said machine tool for stopping machining of said work-piece.

2. The system of claim 1, wherein said control unit is adapted to continuously adjust said flow rate and said pressure of said coolant flow via said coolant delivery unit during the machining of the work-piece.

3. The system of claim 2, wherein said control unit is adapted to feed-back control said flow rate and said pressure using said target flow rate, said target pressure, said measured flow rate, and said measured pressure.

4. The system of claim 1, wherein:
   said coolant delivery unit comprises a pump and a pressure valve, and
   said control unit is adapted to control a speed of said pump for adjusting said flow rate to said target flow rate, and a pressure valve position for adjusting said pressure to said target pressure.

5. The system of claim 4, wherein said control unit is adapted to control said speed of said pump by controlling a frequency of an electrical current supplied to said pump.

6. The system of claim 1, wherein, upon detection of said first anomaly, said control unit is further adapted to prevent re-starting of the machine tool after completion of the machining of the work-piece.

7. The system of claim 6, wherein said control unit is further adapted to stop said coolant delivery unit for stopping said coolant flow.

8. The system of claim 1, wherein, upon detection of said second anomaly, said control unit is further adapted to at least one of output an emergency alert and shut down said coolant delivery unit after the machine tool has been stopped.

9. The system of claim 1, wherein said machining tool is a superabrasive machining tool.

10. The system of claim 1, wherein said coolant is one of an inflammable mineral oil-based coolant and a non-inflammable water-soluble coolant.

11. The system of claim 1, wherein said flow rate sensor is a calibrated pressure-differential Venturi flow meter and said pressure sensor is a pressure-differential calibrated flow sensor.

12. A control unit for monitoring a coolant flow delivered to a machining tool for machining a work-piece, said control unit comprising:
- a pressure controller for setting a pressure of said coolant flow to a target pressure;
- a flow rate controller for setting a flow rate of said coolant flow to a target flow rate; and
- an anomaly detector adapted to:
    - receive a measured flow rate and a measured pressure for said coolant flow from a flow rate sensor and a pressure sensor, respectively;
    - detect a first anomaly when at least one of a measured flow rate and a measured pressure deviates from said target flow rate and from said target pressure, respectively, by a first predetermined amount, and output an alarm signal while allowing said machining of said work-piece to continue; and
    - detect a second anomaly when at least one of said measured flow rate and said measured pressure deviates from said target flow rate and said target pressure, respectively, by a second predetermined amount greater than said first predetermined pressure amount, respectively, and send a stop signal to said machining tool for stopping said machining of said work-piece.

\* \* \* \* \*